Jan. 11, 1966 L. NAMENYI-KATZ 3,229,269

MULTIPLE-DISC TYPE RANDOM ACCESS STORE

Filed Jan. 10, 1962 3 Sheets-Sheet 1

Jan. 11, 1966 L. NAMENYI-KATZ 3,229,269

MULTIPLE-DISC TYPE RANDOM ACCESS STORE

Filed Jan. 10, 1962 3 Sheets-Sheet 2

Jan. 11, 1966 L. NAMENYI-KATZ 3,229,269

MULTIPLE-DISC TYPE RANDOM ACCESS STORE

Filed Jan. 10, 1962 3 Sheets-Sheet 3

United States Patent Office 3,229,269
Patented Jan. 11, 1966

3,229,269
MULTIPLE-DISC TYPE RANDOM ACCESS STORE

Laszlo Namenyi-Katz, Roehampton, England, assignor to The Plessey Company Limited, Ilford, England, a British company Filed Jan. 10, 1962, Ser. No. 165,458
Claims priority, application Great Britain, Jan. 11, 1961, 1,225/61
7 Claims. (Cl. 340—174.1)

This invention relates to a device for storing items of information along concentric tracks provided on each of a plurality of coaxially arranged rotatable discs while providing random accessibility to each storage space for reading and/or recording information, and is particularly though not exclusively intended for computer memory stores in which the information is recorded magnetically.

In order to achieve random access to any desired track on any of the discs of such store it has previously been proposed to form the discs with alignable apertures which are adapted to form a passage along which a transducer head can be moved for selection of a disc, and to provide means for after selection of a disc, rotating the selected disc about its axis to effect recording or reading of information in the selected storage space, and the present invention has for an object to provide a store of this kind which has improved means for reliably rotating a selected disc for cooperation with a transducer or transducers to record or read an item of information.

Another object is to provide an improved random access store of the said kind which has improved means permitting individual discs to be removed from or inserted into the store.

According to the present invention each disc has a hub portion formed with a keyway, the store including a support spindle on which the hub portions of a plurality of the discs are axially slidable, a driver key fitting the keyway of each hub member and of less axial length than such hub member being associated with the support spindle to engage the keyway of the hub member of each disc when said disc is in a predetermined position, and means being provided for placing a selected disc in this position and for rotating the driver key about the axis of the spindle to rotate the selected disc and for preventing rotation of the remainder of the discs.

Preferably the support spindle is constituted of two aligned sleeves separated by a rotatable disc, said disc carrying said driver key and being fixed on or forming part of a rotatable drive spindle extending through the hollow interior of one of both of said sleeves, each of said sleeves being provided with a holding key, said holding keys engaging the keyways in the hub members of the remaining discs to prevent the latter from rotation when the inner spindle and driver key are rotated.

Alternatively the driver key may be provided on a rotating spindle which constitutes the support spindle and on which the hubs of all the discs are mounted so as to be rotatable relative to said spindle except when engaged by said key, means being provided and thus producing axial relative displacement of the discs and said spindle for obtaining cooperation of said key with the keyway of the hub member of a selected disc, and means for preventing the remainder of the discs from rotation with the shaft.

Other objects and features of the invention will become apparent as this specification proceeds.

Two forms of a random access magnetic store incorporating the invention will now be described by way of example with reference to the accompanying drawings, in which.

Figure 1:
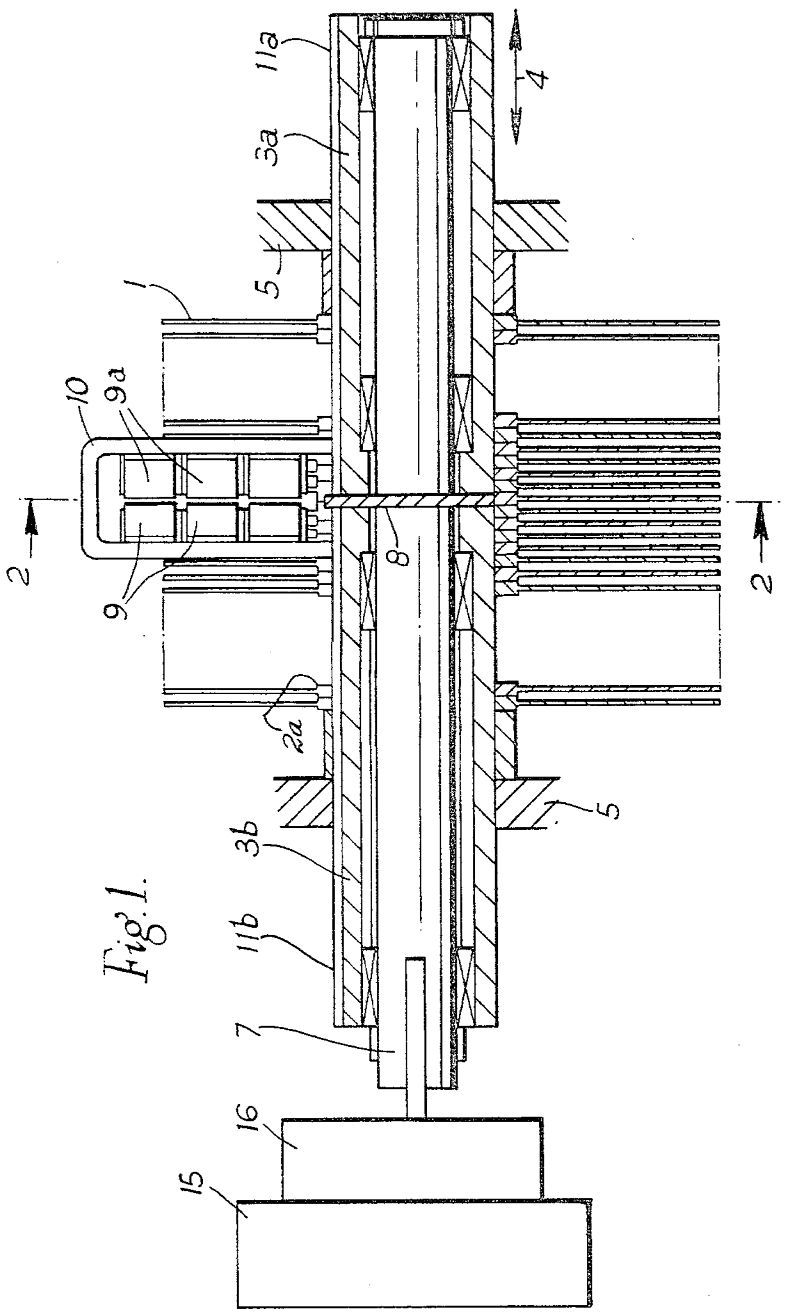
FIGURE 1 is a vertical sectional view of a preferred form of the invention.
Figure 2:
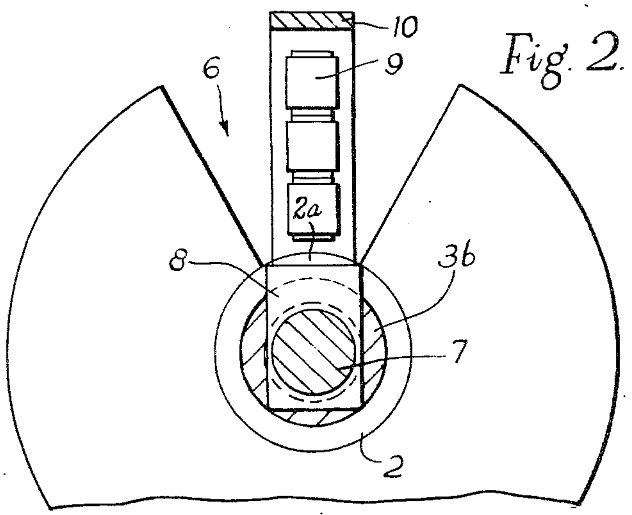
FIGURE 2 is a sectional view taken on the line 2—2 of FIGURE 1.

Referring first to FIGURES 1 and 2, the random access magnetic store includes a plurality of magnetic oxide coated discs 1. Each disc 1 is formed with a tubular hub member 2 rotatably mounted on one of a pair of cylindrical tubes **3*a* and 3*b*. These tubes are fixed against rotational movement but are capable of sliding movement (in the direction of the arrows 4, FIGURE 1) relative to the discs, which are held against lateral movement (i.e. parallel to their axes) by end stops shown at 5. Each disc 1 has a segment 6, preferably extending over 100° of arc, and continued by a keyway 2*a* in its hub member 2, cut away. Coaxial with the tubes 3*a* and 3*b* and disposed therewithin, is a shaft 7 which is capable of sliding movement (in the direction of the arrows 4, FIGURE 1) with the tubes and is capable of rotational movement relative to the tubes. The shaft is rotatably driven from an electric motor 15 by means of a one revolution clutch 16. Fixed to the shaft 7 is a key 8 of a length not exceeding the length of a hub member 2 and of such a width that it is a sliding fit in the keyway 2*a* of the hub member of each disc 1**.

9 and **9*a* are magnetic recording or reproducing heads or both. These heads are mounted in a frame 10 which is secured to the tubes 3*a* and 3*b*. In the normal position of the discs 1 all the segments 6 are aligned, and the dimensions of the frame 10** are such that it can slide with the tubes axially along the passage formed by the aligned cut-away segments of the discs.

The tubes **3*a* and 3*b* (together with the frame 10) and the shaft 7 are then free to slide axially to a selected position in which the key 8 engages in the keyway of the selected disc. Operation of the one-revolution clutch 16 will then rotate the shaft 7 once, and in so doing will rotate the selected disc past the head or heads 9 for the purpose of recording information on or reproducing information from the selected disc. While the selected disc is being rotated the remaining discs are held against rotation on the tubes 3*a* and 3*b* by holding keys 11*a* or 11*b* which engage the keyway 2*a* in the hub member of each of these discs 1**.

The width of each hub member 2 is such that it bridges the gap between the ends of the tubes **3*a* and 3*b* adjacent to the key 8 when the tubes are in position for normal operation, and means may be provided allowing limited axial movement of the tubes 3*a* and 3*b* relative to the shaft 7 to produce a gap between the key member 8 and the adjacent end of one of the tubes, through which a disc may be readily withdrawn between the key 8 and the end of the tube. If desired, the tubes 3*a*, 3*b* may be spring urged into normal abutment with the key 8**.

Apparatus may be provided for controlling sliding movement of the tubes **3*a* and 3*b* and rotational movement of the shaft 7** in response to electric signals from an electronic computer of which the magnetic store may form a part.

Figure 3:
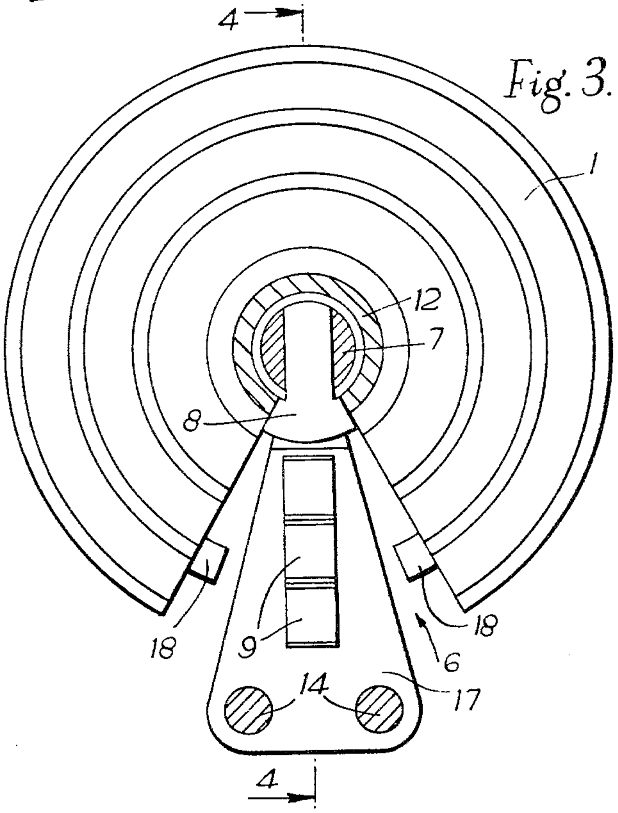
FIGURE 3 is an end on view of another form of the invention.
Figure 4:
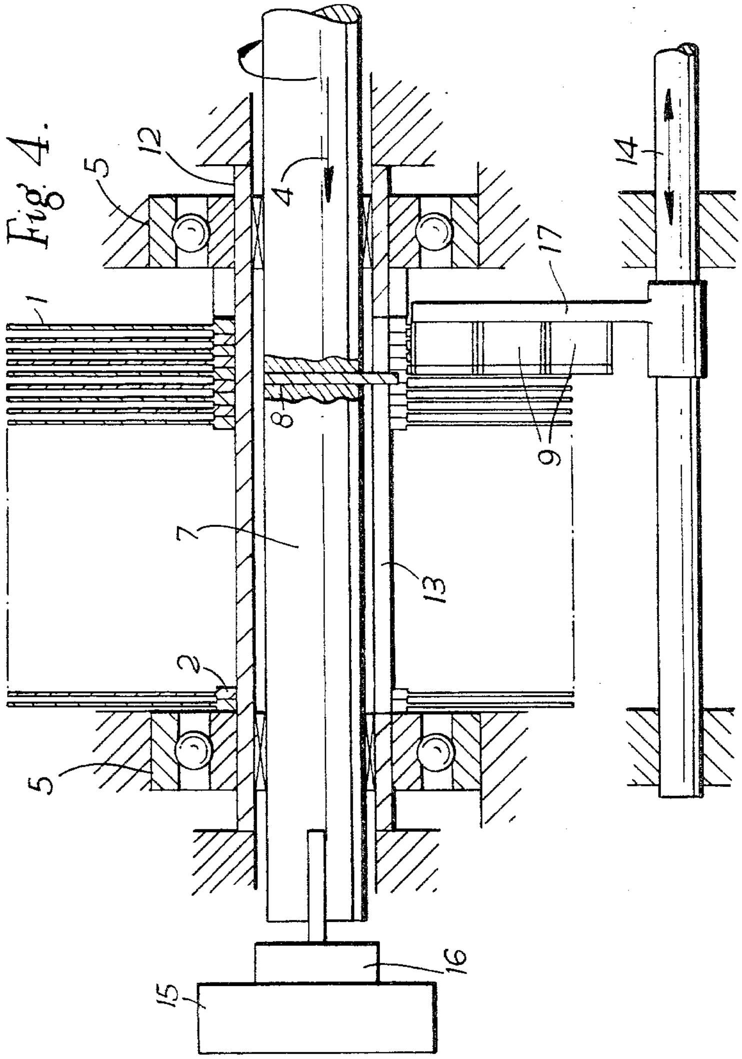
FIGURE 4 is a sectional view taken on the line 4—4 of FIGURE 3.

Referring to FIGURES 3 and 4, in which like reference numerals refer to the same parts as in FIGURES 1 and 2, the tubes 3*a* and 3*b* of FIGURES 1 and 2 are replaced by a single cylindrical tube 12 having a cut-away segment 13 extending over the same area as the cut-away segments in the discs, and while similarly to the embodiment of FIGURES 1 and 2 the shaft 7 is able to slide axially relative to the tube 12, which is held against lateral movement, the shaft and the tube in this modified embodiment are keyed for rotation together. A frame 17 supporting the recording and/or reproducing head or heads 9 is fixedly supported on a pair of rods 14 which are arranged to slide longitudinally with the shaft 7. Thus the key 8 can be moved by means of the shaft 7 to engage the cut-away segment in any selected hub member 2, and when the shaft 7 and tube 12 are rotated by the one revolution clutch, the selected disc is rotated past the head or heads 9. Means such as guide bars 18 must be provided at both sides of the selected disc engaged by key 8 for preventing rotation of the remaining discs.

What I claim is:

1. In a random-access store of the kind including a plurality of coaxially arranged discs having alignable apertures adapted to form a passage, a transducer head movable along such passage into individual cooperation with a selected disc, and means for rotating a selected disc about its axis to effect transduction along a track on such disc, the combination comprising a hub portion on each disc, said hub portion being connected with the disc for common rotation therewith and formed with a keyway, support spindle means on which the hub portions of all of a plurality of discs are supported for relative axial sliding movement, a driver key fitting the keyway of each hub portion and of an axial length not exceeding that of each hub portion, said key being associated with the support spindle to engage the keyway of the hub portion when said hub portion is in a predetermined position on the spindle, means for placing a selected disc in said predetermined position, means for rotating the driver key about the axis of the spindle to rotate the selected disc, and, means preventing rotation of the non-selected discs.

2. A random-access store as claimed in claim 1, wherein the support spindle includes two aligned sleeves held against rotation and separated by a rotatable member carrying said driver key, a rotatable drive spindle extending through the hollow interior of at least one of said sleeves, said rotatable member being at least on the drive spindle, and each of said sleeves being provided with a holding key engaging the keyways in the hub members of the non-selected discs.

3. A random-access store as claimed in claim 1, including a support spindle on which the hubs of all the discs are rotatably mounted, a drive spindle rotatably jointly with the support spindle, the driver key being fixed on said drive spindle, means for producing relative axial displacement of the disc and said support spindle for obtaining cooperation of said key with the keyway of the hub member of a selected disc, and means preventing the remainder of the discs from rotation with the shaft.

4. A random-access store as claimed in claim 2, wherein at least one of said two aligned sleeves is axially movable away from the key to provide a gap between the sleeve and key at least substantially equal in width to the axial length of each hub portion.

5. A random-access store as claimed in claim 4, wherein the drive spindle extends to both sides of the driver key, the store including discs having normally aligned apertures, said apertures extending from the circumference of each disc through the hub to the hollow interior thereof, the width of said apertures being throughout at least equal to the diameter of the drive spindle.

6. In a random-access information store in which the information is recordable on and playable back from concentric tracks on each of a plurality of coaxially arranged discs, the combination comprising a plurality of discs having aligned hub portions which are connected with the discs for common rotation, a rod member on which said hub portions are rotatably supported, a driver key and a transducing head coupled for movement together in a direction perpendicular to the plane of said discs, each said hub portion having a keyway for cooperation with said key, and said key engaging the keyway in the hub portion of any selected one of said discs at a time, and means for rotating said key about the axis of the discs to rotate the selected disc past said transducing head, means cooperating with such keyway to prevent rotation of all discs but the selected one, said disc having normally aligned cut-away portions which when aligned form a passageway for said movement of the transducing head.

7. A random-access information store in which the information is recordable on and playable back from concentric tracks on each of a plurality of coaxially arranged discs, the combination comprising a plurality of discs having aligned hub portions each having a central aperture and extending partially around and being rotatably supported on a spindle, a transducing head, means coupled for movement with said transducing head in a direction perpendicular to the plane of said discs, said means being engageable with any selected one of said discs at a time and being capable of causing rotation of the selected disc past said transducing head, and means for preventing rotation of the non-selected discs, said discs having normally aligned cut-away portions, said portions forming when aligned a passageway for said movement of the transducing head, the cut-away portion in each disc extending through the periphery thereof and continuing into the central aperture in its hub portion, to permit radial removal of the disc from the spindle.

References Cited by the Examiner

UNITED STATES PATENTS 2,690,913 10/1954 Rabinow ---------- 340—174.1

IRVING L. SRAGOW, *Primary Examiner.*

R. J. McCLOSKEY, V. CANNEY, *Assistant Examiners.*